United States Patent
Lyons

(10) Patent No.: US 10,371,304 B2
(45) Date of Patent: *Aug. 6, 2019

(54) VALVE INSERT

(71) Applicant: Ian Lyons, Epsom (GB)

(72) Inventor: Ian Lyons, Epsom (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,453

(22) Filed: Feb. 23, 2018

(65) Prior Publication Data

US 2018/0180211 A1 Jun. 28, 2018

Related U.S. Application Data

(63) Continuation of application No. 15/144,420, filed on May 2, 2016, now Pat. No. 9,933,102, which is a
(Continued)

(30) Foreign Application Priority Data

Mar. 1, 2011 (GB) ...................... 1103591

(51) Int. Cl.
*F16K 15/03* (2006.01)
*F16L 55/105* (2006.01)
(Continued)

(52) U.S. Cl.
CPC .............. *F16L 55/105* (2013.01); *E03F 7/04* (2013.01); *F16K 1/2007* (2013.01); *F16K 15/03* (2013.01);
(Continued)

(58) Field of Classification Search
CPC ...... F16K 15/03; F16K 15/031; F16K 15/033; F16K 1/2007; F16L 55/1018; F16L 55/105; E03F 7/04
(Continued)

(56) References Cited

U.S. PATENT DOCUMENTS 1,683,953 A 9/1928 Carr
1,926,759 A 9/1933 Wallman
(Continued)

FOREIGN PATENT DOCUMENTS

DE 2701157 7/1978
DE 299 15 735 8/2000
(Continued)

OTHER PUBLICATIONS

Office Action for EP Application No. 12 709 682.4-1751 dated Nov. 27, 2017.
(Continued)

*Primary Examiner* — P. Macade Nichols
(74) *Attorney, Agent, or Firm* — King & Partners, PLC

(57) ABSTRACT

An insert is provided for insertion through an opening in the surface of a conduit, the insert comprising an insert body having first and second open ends defining an axis of flow therebetween. The insert further comprises a valve flap connected to the insert body. The valve flap is moveable between a closed position in which it creates a closure, thereby preventing flow along said axis, and an open position in which the valve flap allows flow along the axis. The valve flap is arranged so that, when in the open position, it is substantially U-shaped in side cross-section and is oriented with respect to the insert body so that said U-shape arches over the axis of flow.

23 Claims, 15 Drawing Sheets

Related U.S. Application Data continuation of application No. 14/002,422, filed as application No. PCT/GB2012/000207 on Mar. 1, 2012, now Pat. No. 9,353,875.

(51) Int. Cl.
*F16K 1/20* (2006.01)
*F16K 27/02* (2006.01)
*F16L 55/10* (2006.01)
*E03F 7/04* (2006.01)
*F16L 55/07* (2006.01)

(52) U.S. Cl.
CPC .......... *F16K 15/031* (2013.01); *F16K 15/033* (2013.01); *F16K 27/0227* (2013.01); *F16L 55/07* (2013.01); *F16L 55/1018* (2013.01); *Y10T 137/0486* (2015.04); *Y10T 137/6017* (2015.04); *Y10T 137/7903* (2015.04)

(58) Field of Classification Search
USPC ................... 137/527, 527.2, 527.8
See application file for complete search history.

(56) References Cited

U.S. PATENT DOCUMENTS

| | | |
|---|---|---|
| 2,266,421 A | 12/1941 | Griffith |
| 2,572,299 A | 10/1951 | Antolch |
| 3,749,108 A * | 7/1973 | Long ................. F16L 55/105 137/15.17 |
| 4,266,569 A | 5/1981 | Wilson |
| 5,044,396 A | 9/1991 | Daudet et al. |
| 5,785,077 A | 7/1998 | Rice |
| 6,155,291 A | 12/2000 | Powell |
| 9,933,102 B2 * | 4/2018 | Lyons ................. F16K 15/031 |
| 2006/0027271 A1 | 2/2006 | Klipfel et al. |
| 2008/0001397 A1 | 1/2008 | Chang et al. |
| 2009/0230340 A1 | 9/2009 | Purkis |
| 2010/0251987 A1 | 10/2010 | Sano |

FOREIGN PATENT DOCUMENTS

| | | |
|---|---|---|
| DE | 10 2004 047 093 | 6/2006 |
| EP | 305572 | 3/1989 |
| EP | 1 845 293 | 10/2007 |
| GB | 2320310 | 6/1998 |
| GB | 2401629 | 11/2004 |
| GB | 2459346 | 10/2009 |
| GB | 2488877 | 9/2012 |
| JP | 2000303531 | 10/2000 |
| JP | 2004066154 | 3/2004 |
| WO | 1992014888 | 9/1992 |
| WO | 2007059582 | 5/2007 |
| WO | 2012117222 | 9/2012 |

OTHER PUBLICATIONS

Combined search and examination report issued by the UKIPO for GB 1701601.5 dated Feb. 9, 2017.

* cited by examiner

VALVE INSERT

CROSS-REFERENCE TO RELATED APPLICATIONS

This application is a continuation of U.S. application Ser. No. 15/144,420 filed May 2, 2016, which is a continuation of U.S. application Ser. No. 14/002,422 filed Nov. 11, 2013, which is a 35 U.S.C. § 371 national phase application of PCT Application No. PCT/GB 12/000207, filed Mar. 1, 2012, which claims priority to Great Britain Application No. 1103591.2, filed Mar. 1, 2011, each of which is incorporated herein by reference in its entirety.

This invention relates to a valve insert and in particular to a kit for providing a non-return valve within a conduit.

BACKGROUND

Valves are widely used in many industries for controlling fluid or other flow through a pipe or conduit. A non-return valve, also known as a one way valve, is a particular type of valve which operates by opening when the fluid is flowing in one axial direction along the pipe, allowing substantially free flow of the fluid therethrough, and by closing in response to fluid flow in a second, opposite axial direction along the pipe to prevent throughflow in that second direction. Non-return valves are used in plumbing, mechanics, hydraulics, pipelines, steamlines and many other industries that use pipes or conduits with fluid including liquid, steam or other gas running through them.

In conventional arrangements, non-return valves are generally big and bulky and often considerably reduce the bore of the pipe in which they are used. Thus, even when a conventional non-return valve is open in order to allow fluid flow in a first direction, the fluid flow is still at least partially impeded by the presence of the valve itself. Furthermore, fitting these relatively large valves can be difficult and time consuming, particularly in tight or confined spaces.

Conventional valves are generally housed within a body which has shoulders, knuckles or other features which connect to a pipe at either end. For example some non-return valves include flaps which fit onto the end of the pipes, capping the end of the pipe. These conventional valves require considerable space to be available within a pipe or other conduit in order to fit the valve therein. For example some valves include flaps or other components that need to be turned sideways or otherwise moved upon insertion into a pipe, which requires considerable space within the pipe as well as considerable user skill and effort in fitting the valve.

When a conventional valve is fitted in a pipe, it is often necessary to cut through the pipe completely in order to insert the valve therewithin. This causes the pipe to lose some of its rigidity and strength and thus has a negative effect on the life expectancy of the pipeline.

There is no known device or approach for implementing a valve, in particular a non-return valve, in a pipe in a compact and efficient manner and without significantly compromising the rigidity and strength of the pipeline.

An invention is set out in the claims.

According to an aspect there is provided an insert for providing a valve in a conduit, the insert being arranged for an insertion through an opening in a surface of the conduit, the insert comprising a body having first and second open ends defining an axis of flow therebetween. For example, the opening may be a slot cut through part of a cross section of the conduit. The insert further comprises a valve flap connected to the body, wherein the valve flap is moveable between a closed position in which the valve flap creates a closure, thereby preventing flow along said axis, and an open position in which the valve flap allows flow along said axis. The valve flap is arranged so that, when it is in an open position, it is substantially U-shaped in side cross-section and is oriented with respect to the insert body so that the U-shape of the valve flap arches over the axis of flow.

Because the insert is arranged for insertion through an opening in a surface of a conduit, it can be used to provide a valve at any point along the length of the conduit, not just at one end thereof. Furthermore, because the insert can be inserted through an opening in the surface of the conduit, it is not necessary to cut through an entire cross-section of the conduit in order to place the insert and thus provide a valve therein. Therefore the integrity of the conduit can be maintained but at the same time a valve can be provided reliably in that conduit.

By providing an insert including a body having first and second open ends, defining an axis of flow therebetween, and a valve flap connected to that body and rotatable between a closed position in which the valve flap forms a closure and an open position, flow of fluid or other material can be controlled. Because the valve flap is substantially U-shaped in side-cross section when in an open position, it can be oriented to arch over the axis of flow when in that open position. Thus the valve flap is minimally invasive when in the open position and so enables increased flow.

Movement of the valve flap from the closed position to the open position can be limited to a single rotational direction only, as a result of which a non-return valve is provided. Furthermore, the cross section of the valve flap when viewed along the axis of flow and when in the closed position can be matched to the cross section of the body and/or of the conduit to form a closure, thereby making the valve reliable and leak-proof. This reliability can be improved by the provision of a seal to cooperate with the valve flap to form a closure.

At least a portion of an inner surface of the insert body can be curved, and the curvature of the U-shape of the valve in an open position can be matched to the curvature of said portion of the inner surface of the body. The valve flap can therefore sit closely against that inner surface when in an open position. Therefore the presence of the valve flap embraces the flow though the body and is minimally invasive to the cross sectional area of the body.

The valve flap may be rigid or it may be at least partially deformable. When the valve flap is at least partially deformable, it can take on a substantially planar configuration when in the closed position and can take on a substantially curved or U-shaped configuration when in an open position. The body of a deformable valve flap can include relatively rigid portions that can assist with rigidity of the valve when it is in the substantially planar, closed configuration and/or can guide deformation of the flap into a suitable shape in the open position. In its substantially planar configuration the deformable valve flap serves to provide a reliable closure within a conduit while in its deformed open position it arches over flow in the conduit, maximising the available throughflow volume therein.

According to an aspect there is provided a method of installing an insert for provision of a valve in a conduit. The method comprises creating a slot in the surface of the conduit, said slot not extending across a full cross-section of the conduit, and fitting the insert, which includes an insert body and a valve flap, via said slot. Preferably the slot extends across no more than half a cross-section of the conduit. The slot can be cut in a direction substantially perpendicular to the direction of fluid flow in the pipe.

Thus a reliable, easy to use and cost-effective solution is provided.

DESCRIPTION OF FIGURES

Embodiments and examples will now be described with reference to the figures, of which:

FIG. 1c shows a hinged valve flap, fitted with a hinge and spring, comprised within the valve of FIG. 1a;

FIG. 4b is a section through the pipe of FIG. 4a;

OVERVIEW

In overview, there is provided an insert for implementing a valve in a pipe or conduit, preferably wherein said valve is a non-return or one way valve.

The insert preferably comprises a body with first and second open ends and a valve flap, which can attach to the body in any suitable manner. For example, a hinge and spring mechanism may be provided to enable the valve flap to move to an open position in response to fluid flow in a certain axial direction in the pipe and to return to a closed position in the absence of such a flow.

The valve flap can be substantially saddle shaped. When viewed face-on, i.e. in plan view, the cross-sectional shape of the valve flap corresponds to the inner cross-sectional shape of the body of the insert and/or of the pipe in which the insert is fitted, in order to provide a reliable closure when the valve flap is in its closed position. In side view, the valve flap can be U-shaped, curving about a central diameter or axis. The curvature of the valve flap is such that, when the valve is open to allow flow through the pipe, the valve flap will arch around the flow, preferably corresponding to the inner profile of the pipe. This enables the valve flap to cause minimal disruption to the cross-sectional area available for throughflow in the pipe. Alternatively, the valve flap can be substantially planar when in a closed position in a pipe and can be deformed to be U-shaped, to fit against an inner surface of the pipe, when in an open position.

The valve insert can be fitted in a pipe using any suitable means. For example, an insert may be fitted to a pipe by cutting a slot into the pipe around part of its outer circumference and affixing the insert via that slot. Straps, sleeves or other suitable means can be provided to fix the insert in position within the pipe and to help provide a reliable seal when the valve insert is in use. This makes the insert suitable for implementing a one-way valve even in a pipe where space and/or access is limited, for example a toilet pipe.

The insert may have any suitable cross-sectional shape, in order to fit reliably into the pipe or conduit in which it is to be used. In the event that the valve needs to be altered, removed or replaced, the insert can be simply and quickly removed from the pipe, for example using a slot via which the insert was fitted to the pipe initially, and can be replaced or amended as appropriate. There is no need to make any changes to the pipe in order to change or replace the valve insert as described herein. Therefore an efficient and cost effective valve system is provided.

DETAILED DESCRIPTION

Figure 1A:
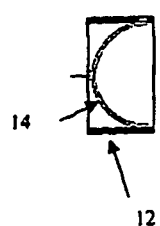
FIG. 1a is a side cross-sectional view of a valve insert.
Figure 1B:
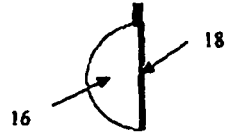
FIG. 1b shows the body of the valve insert of FIG. 1a, including a seal.
Figure 1C:
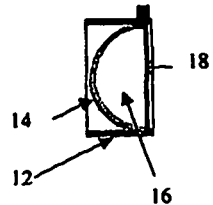

FIGS. 1a to 1c show a possible embodiment of an insert which can be used to provide a non-return valve in a conduit.

The insert 10 comprises an open-ended body 12 formed by a continuous substantially cylindrical or annular wall, having a seal 14, for example a rubber seal, on an inner surface thereof. As will be understood further from the description below, the seal 14 is shaped so as to cooperate with a substantially rigid valve flap 16 so that, when the valve flap 16 is in a closed position within the insert 10 in use, a reliable seal against passage of fluid or other material therethrough is formed. In the embodiment shown in FIGS. 1a to 1c, the insert 10 is usable in a pipe or conduit having a substantially circular cross-section. Therefore the surface of the insert body 12 is substantially annular, the valve flap 16 is substantially circular in plan view and the seal 14 is substantially semi-circular or U-shaped in cross-sectional side view.

Figure 7A:
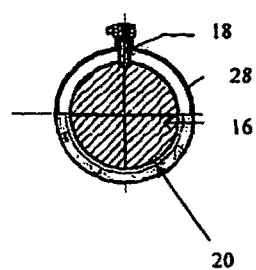
FIG. 7a is a section through a pipe including a valve insert when the valve flap is closed.
Figure 7B:
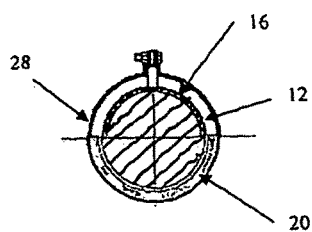
FIG. 7b shows the pipe of FIG. 7a when the valve flap is open.

As can be appreciated best from FIGS. 7a and 7b herein, the thickness of the substantially annular wall which forms the body 12 of the insert 10 shown in FIGS. 1a to 1d varies along its circumference. The lower semi circular portion of the wall when viewed in cross section is relatively thin, whilst the upper semi circular portion of the wall when viewed in cross section is relatively thick. This configuration arises because, as described below, a slot can be made in a pipe for fitting the insert 10 therein and so the upper part of the body 12 of the insert 10 should be thicker to account for the lack of pipe wall where that slot has been cut.

The insert 10 as shown in FIGS. 1a to 1c further comprises a combined hinge and spring mechanism 18. The valve flap 16 attaches to the body 12 of the insert 10 via the hinge. As shown in FIG. 1a, the valve flap 16 corresponds to the body 12 so that, when the valve flap 16 is hingedly attached to the body 12 and is in a closed position as shown in FIG. 1b, the valve flap 16 creates a closure within the body 12, preventing flow therethrough. As mentioned above, a seal 14 can be provided for the valve flap 16 to fit into or against in order to provide a reliable sealing closure.

To create a non-return valve, the hinge and spring mechanism 18 is arranged so as to limit rotational movement of the valve flap 16 about the hinge in one rotational direction—clockwise in the embodiment of FIG. 1b—so that the valve flap 16 can pivot about the hinge in order to fit against the seal 14 but cannot rotate further in that direction. As a result, if fluid flow or another force acted upon the valve flap 16 shown in FIG. 1b in an attempt to pivot it clockwise about the hinge beyond the seal in order to open the valve, it could not do so. Conversely, the hinge and spring mechanism 18 is arranged to allow rotation of the valve flap 16 about the hinge by at least 90° in the opposite rotational direction—anticlockwise in this embodiment—so that the valve flap 16 can be rotated from the closed position as shown in FIG. 1b to an open position in which it enables flow through the insert 10. Because of the presence of the spring, in the absence of a force acting to rotate the valve flap 16 to an open position, the valve flap 16 will spring back to the closed position.

Figure 2A:
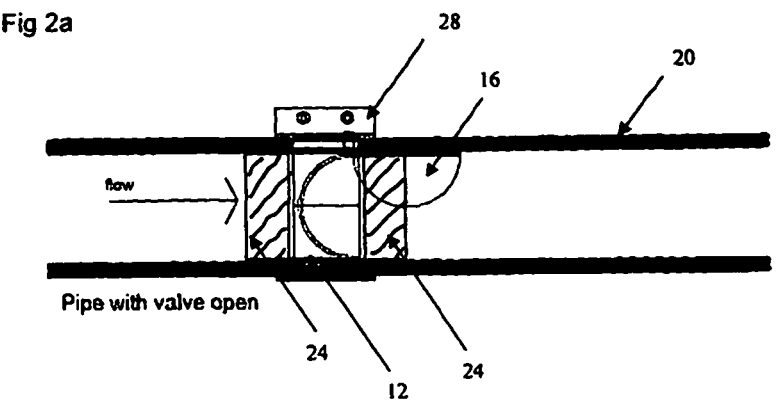
FIG. 2a is a side cross-sectional view of the valve insert of FIG. 1b in a pipe, in an open position, and a jointing strap around the pipe.
Figure 2B:
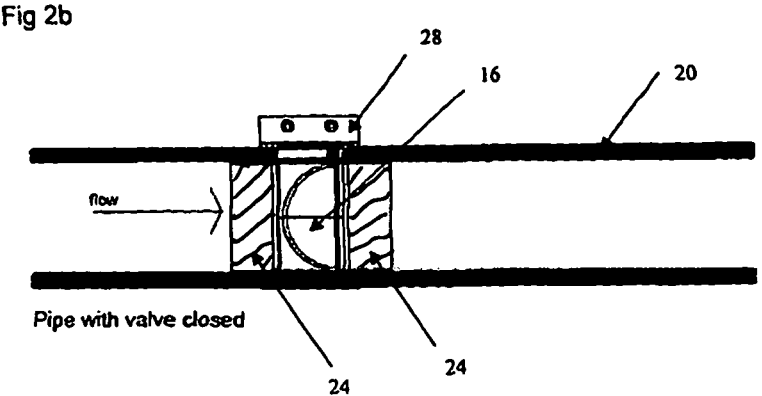
FIG. 2b shows the arrangement of FIG. 2a but with the valve flap in the closed position.

The physical appearance and operation of the insert 10 as shown in FIGS. 1a to 1c can be better understood in the context of its use in a pipe. FIGS. 2a and 2b thus shows the insert 10 in situ within a pipe 20 with a jointing strap 28 fitted outside the pipe 20. FIGS. 9a to 9f also show perspective views of a valve insert inside a pipe 20 without the jointing strap 28 which is shown in FIGS. 2a to 2b. The permitted direction of valve flap movement differs between FIGS. 2a and 2b (anti-clockwise) and FIGS. 9a to 9d (clockwise). The manner in which the insert can be fitted to the pipe 20 will be described later, below.

As can be seen from the figures, the body 12 of the insert 10 should be sized to fit within a cross section of the pipe 20. In the figures a cylindrical pipe 20 is used and thus the insert 10 has a cylindrical or annular insert body 12, as is best seen in FIGS. 9a to 9f. The outer diameter of the body 12 substantially corresponds to the inner diameter of the pipe 20, so that the insert 10 fits snugly within the pipe 20. The body 12 of the insert 10 should comprise a relatively thin annular wall, so as to reduce the bore of the pipe as little as possible.

Figure 9A:
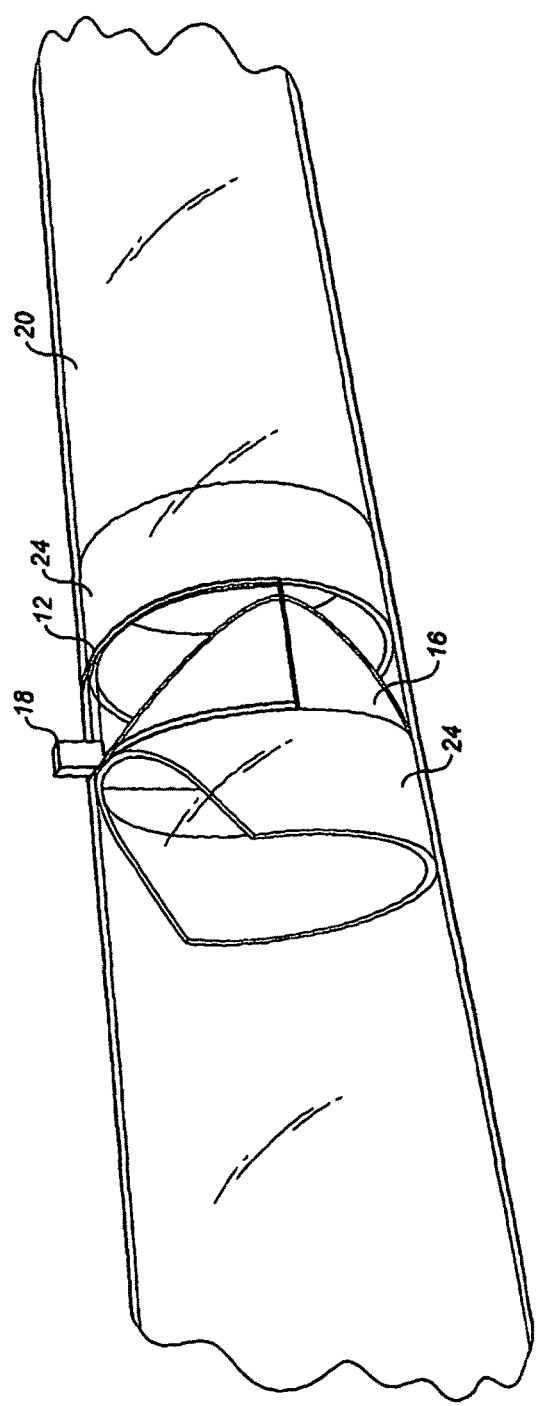
FIG. 9a shows a perspective view of a valve insert when inserted in a pipe with the valve flap in a closed position.
Figure 9B:
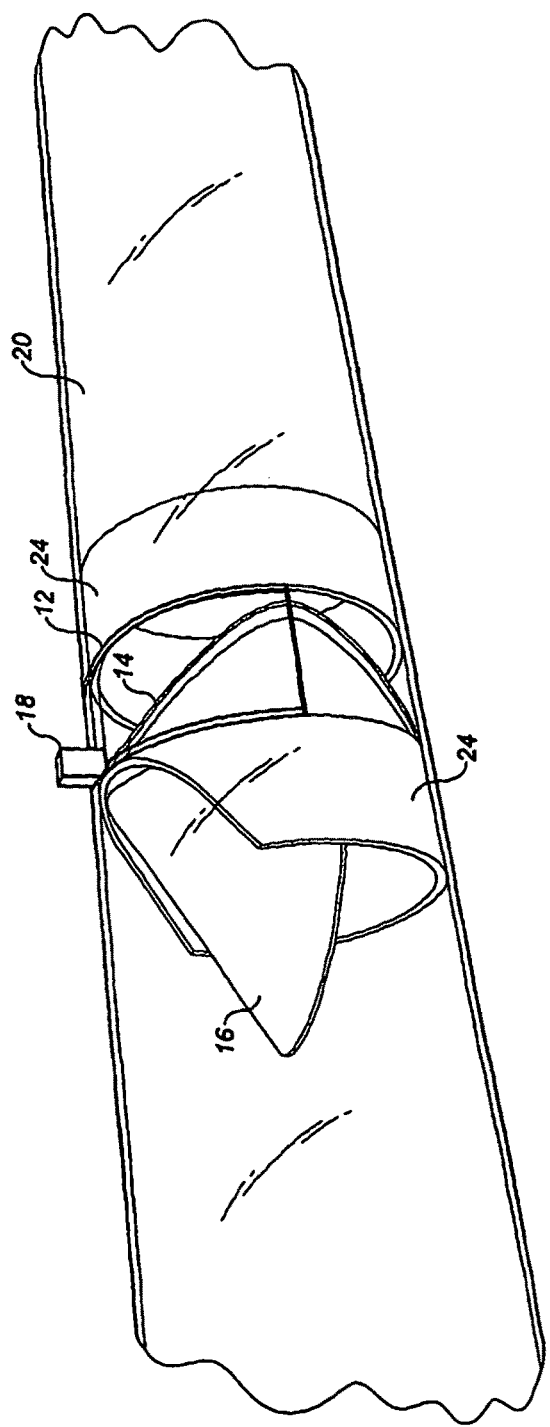
FIG. 9b shows the valve insert of FIG. 9a with the valve flap in a partially open position.
Figure 9C:
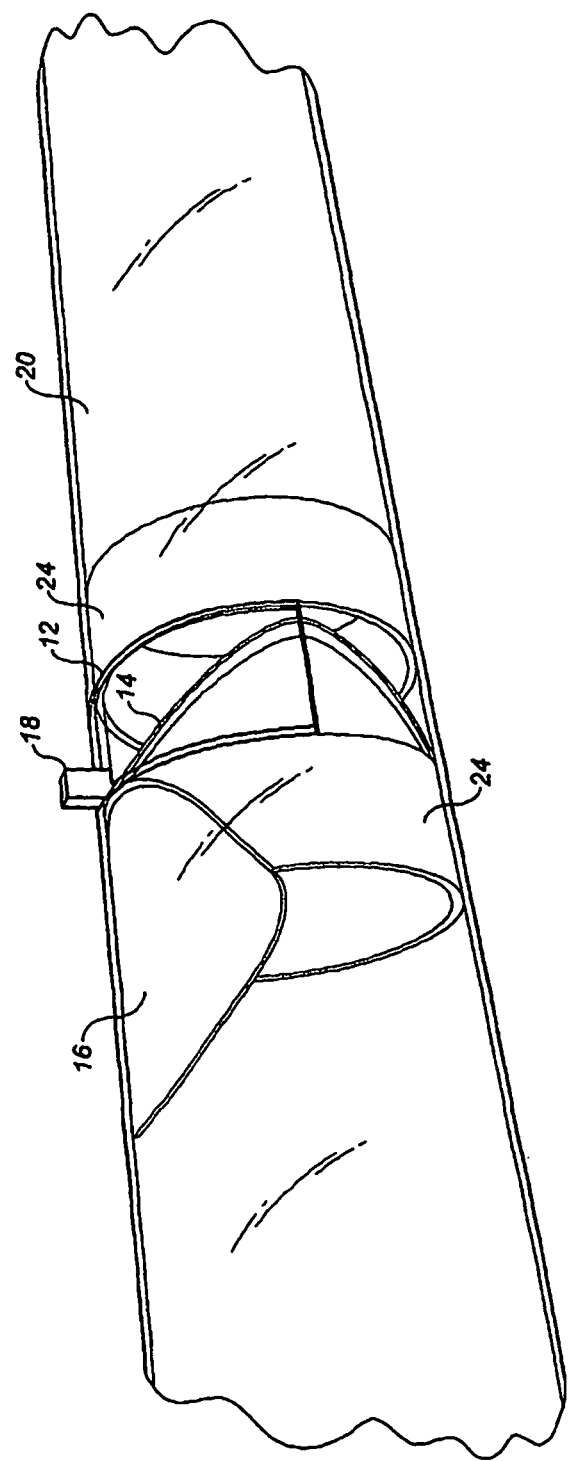
FIG. 9c shows the valve insert of FIG. 9a with the valve flap in an open position.
Figure 9D:
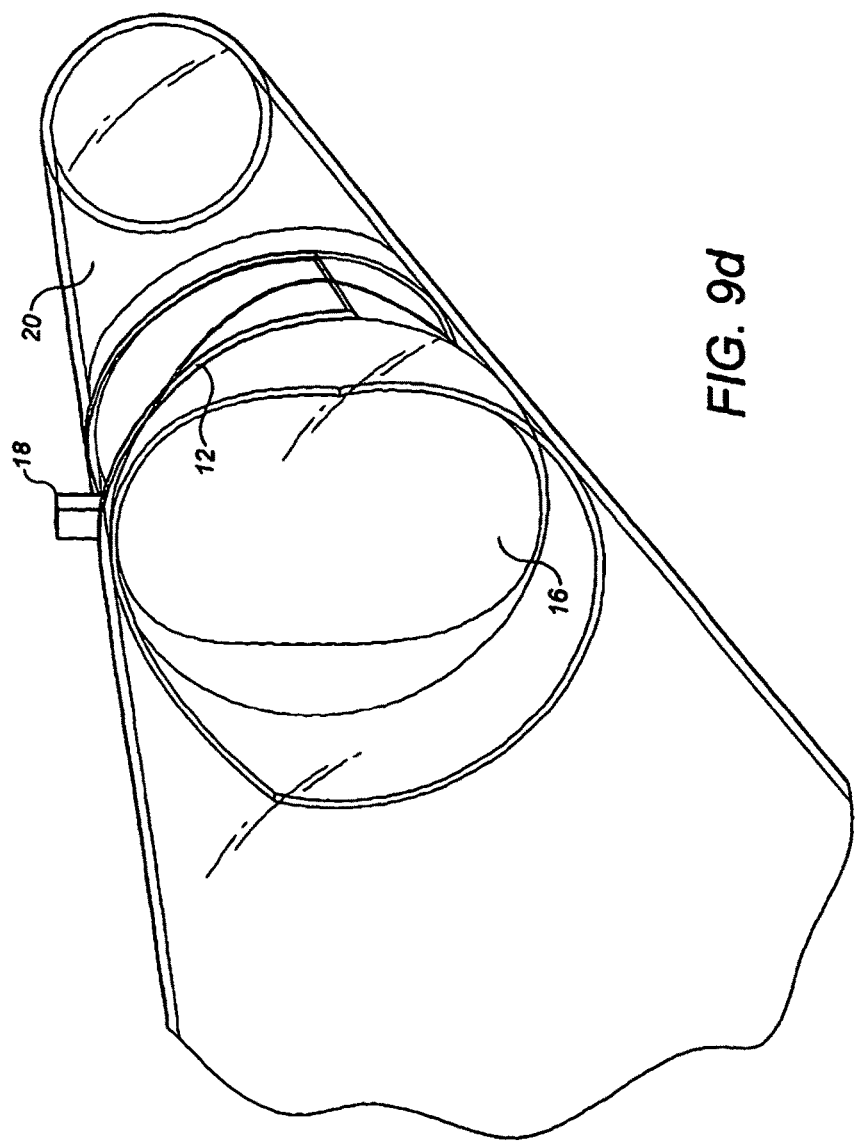
FIG. 9d shows a view along the pipe of FIG. 9a with the valve flap in the closed position.

In the closed position as shown in FIGS. 2b, 9a and 9d, the valve flap 16 creates a closure in the insert 10. The insert 10 fills the pipe bore at the point at which it has been inserted into the pipe 20, therefore closing the valve flap 16 prevents through flow in the pipe 20. The closed non-return valve will resist any turning force caused by a flow or force within the pipe in a non-allowed axial direction. Hence backflow of fluid, gas, odour, rodents or other material in the pipe 20 is prevented.

Figure 9E:
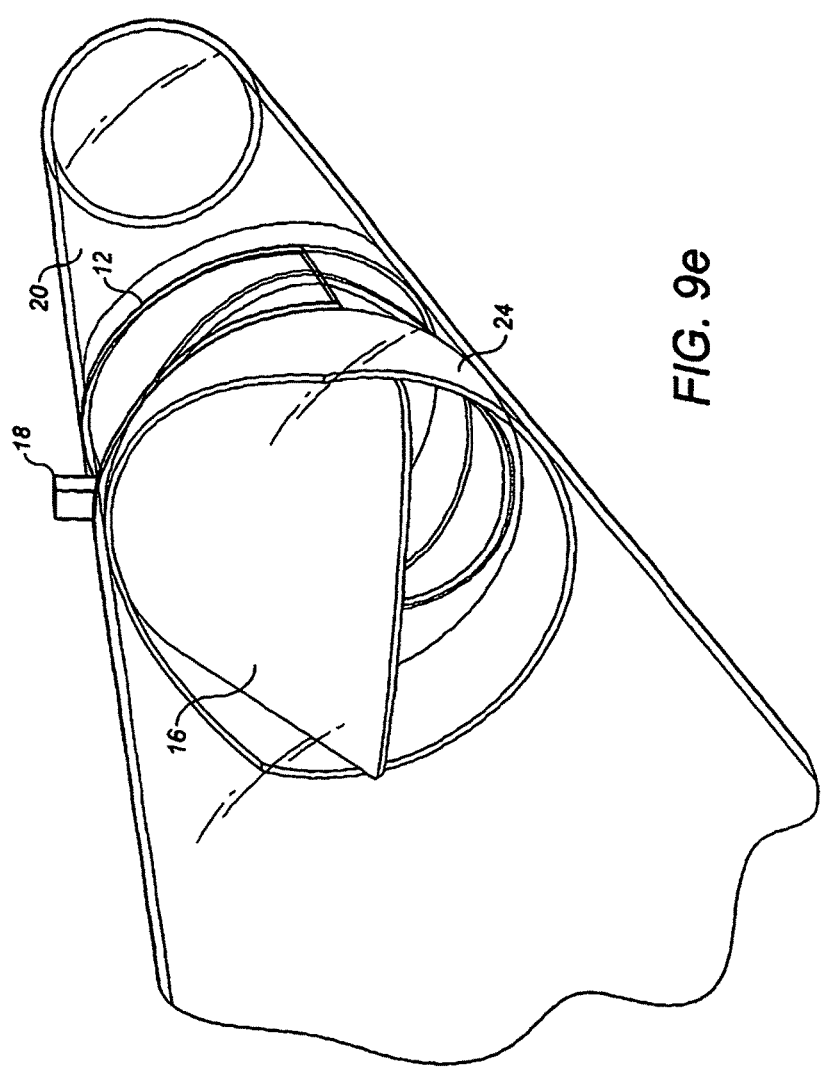
FIG. 9e shows a view along the pipe of FIG. 9b with the valve flap in a partially open position.
Figure 9F:
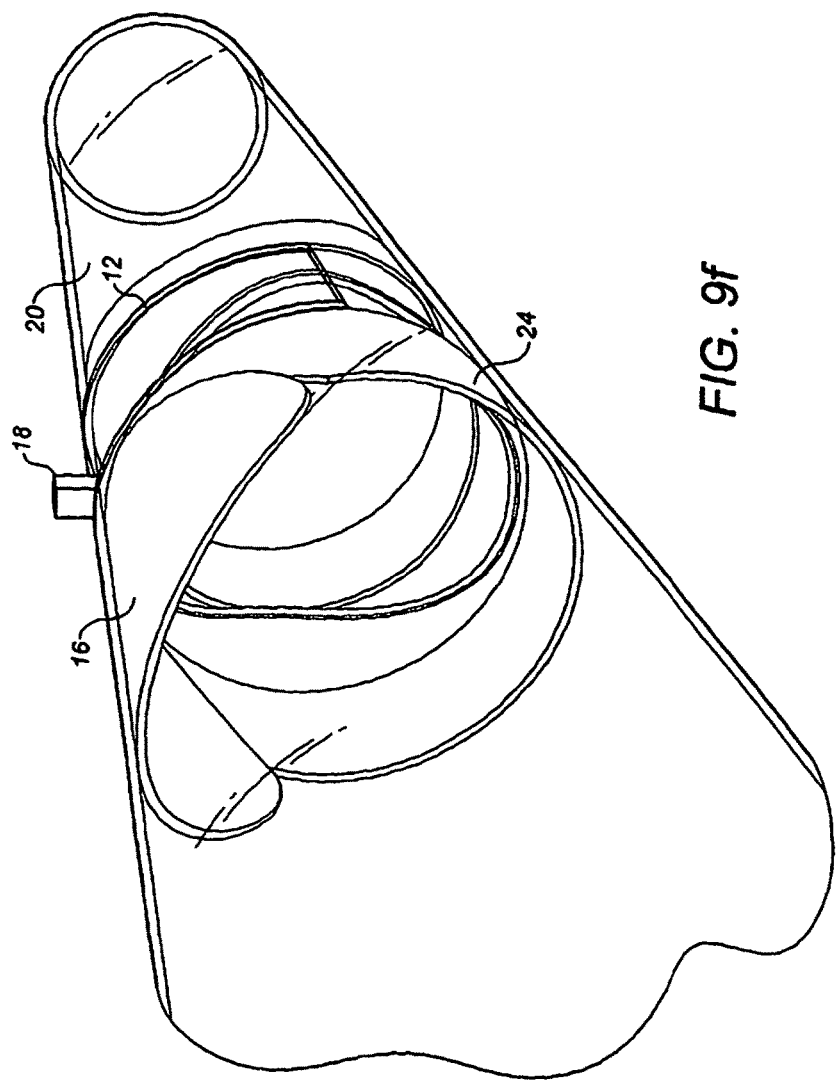
FIG. 9f shows a view along the pipe of FIG. 9c with the valve flap in an open position.

When there is a turning force caused by a flow or force in the allowed direction within the pipe 20, that flow will cause rotation of the valve flap 16 about its hinge and so will cause the valve to open and allow throughflow in the pipe 20 as shown in FIGS. 2a, 9c and 9f. In order to maximise such throughflow, and to minimise the reduction of the pipe bore caused by the presence of the non-return valve, the valve flap 16 is thin. Preferably its thickness is no more than half the diameter of the pipe, and ideally it is much less than that. The valve flap 16 is also, advantageously, curved about one axis. This curvature can be best understood with respect to FIG. 3 and FIGS. 9a to 9f. As can be seen therein, the valve flap 16 is substantially saddle shaped, i.e. U-shaped in side view. The curvature of the valve flap 16 allows the valve flap 16 to cup or arch around the flow in the pipe 20 when the valve flap 16 is in its open position—as seen best in FIGS. 9c and 9f. In this open position, the valve flap 16 arches over and so embraces the flow rather than blocking it.

The curvature of the valve flap 16 is preferably matched to the curvature of the inner surface of the pipe in which the insert 10 is to be used. As a result, when the valve is in a fully open position as shown in FIGS. 2a, 9c and 9f, the outer surface of the valve flap 16 should lie substantially parallel to that inner surface of the pipe 20, preferably flush with it, with minimal gaps or discontinuities therebetween. In addition, the valve flap 16 should be sufficiently thin so that, when it is in an open position, it causes minimal reduction to the bore of the pipe 20 for throughflow of fluid or other material.

As shown in FIGS. 9b and 9e, it is possible for the valve flap 16 to be in a partially open position, between the closed position shown in FIGS. 9a and 9d and the fully open position shown in FIGS. 9c and 9f. The valve flap 16 will be in a partially open position as shown in FIGS. 9b and 9e during opening and closing and also may be partially open when there is a flow through the pipe in the permitted direction but that flow is not large or forceful enough to fully open the valve flap 16. In its partially open position as shown in FIGS. 9b and 9e, the valve flap 16 will arch over the flow which has forced it from the closed position.

There are two different, interacting considerations for the three-dimensional shape of the substantially rigid valve flap 16. As a first consideration, the valve flap 16 should be shaped so as to create a closure and thereby prevent axial flow along the pipe 20 when the valve flap is in a fully closed position therein. In the embodiments described above the pipe 20 and insert body 12 are both cylindrical, such that the valve flap 16 forms a circular closure in its closed position when viewed along the axial flow direction of the pipe, as shown in FIGS. 7a and 9d. Ideally, there should be a seal 14 or valve seat on an inner surface of the insert body 12, wherein that seal 14 is shaped to form a reliable closure with the valve flap 16 in its closed position.

The second consideration for the three-dimensional shape of the substantially rigid valve flap 16 is that, as described above, it should cup or arch around the longitudinal axis of flow through the pipe 20 when the valve flap 16 is in an open position, as shown by way of example in FIGS. 7b, 9c and 9f. The valve flap 16 therefore embraces the shape and direction of the flow through the pipe 20, rather than acting as a blockade against or restriction of that flow. Ideally, the valve flap 16 should lie flush with the inner surface of the pipe 20 and/or with the insert body 12 when in the open position.

Once the three-dimensional shape of the valve flap 16 has been determined, it must be attached to the body 12 of the insert 10 (or directly to the pipe 20) at the correct place and in the correct orientation if the valve is to operate as a non-return valve. Since the purpose of a non-return valve is to allow flow through a pipe or conduit in one direction but not in another, it is important that the suitably shaped valve flap 16 is attached to the body 12 of the insert 10 correctly, based on the permissible direction of flow and hence the permissible rotational direction of the valve flap 16 about the hinge. As described above, when the valve flap 16 is rotated into the open position within a pipe or conduit, the inner face of the valve flap 16 should cup the fluid flow, and should correspond as closely as possible to the inner shape and profile of the pipe or conduit in order to maximise flow therethrough.

Fitting the Insert

The valve insert 10 is particularly advantageous because it can be fitted into any type, size or shape of conduit, even when there is very limited access available to that conduit. An example of how an insert 10 including a valve flap 16 can be fitted to a pipe will now be described. This example involves a pipe 20 of substantially circular cross-section as shown in FIG. 4b, however it will be appreciated that the principle can be applied to other shapes of pipe or conduit.

Figure 4A:
FIG. 4a is a side view of a portion of a pipe in to which a valve insert is to be fitted.
Figure 4B:
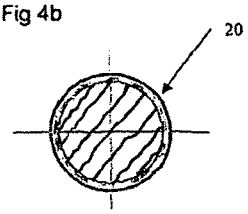
Figure 4C:
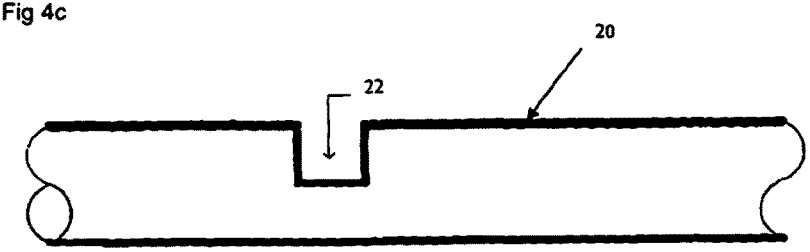
FIG. 4c is a side view of the pipe of FIG. 4a with a slot cut therein for fitting a valve insert.

FIG. 4a shows a pipe 20 before an insert 10 is fitted. In order to prepare the pipe 20 for the insert 10, a slot is cut into the pipe as shown in FIG. 4c. The slot 22 should be sized to enable fitting of the insert 10 into the pipe 20, and to ensure that the pipe 20 and insert 10 form a leak-proof continuum after this fitting has taken place. For the pipe 20 shown in FIGS. 4a to 4c which has a substantially circular cross-section, a substantially annular insert 10 as described above with respect to FIGS. 1a to 2b can be used. In order to fit an annular insert 10 to the pipe 20, a semi-annular section of the pipe 20 must be removed. Therefore, as shown in FIG. 4c, the slot 22 only extends across half the diameter of the pipe 20. Since there is no complete severing or cut through of the pipe 20 at any point along its length in this process, the majority of the pipe's rigidity and strength is maintained. There is no need to cut right through the pipe.

Figure 5A:
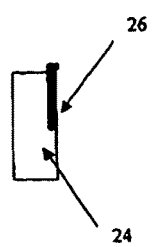
FIG. 5a is side cross-sectional view of a sleeve to be fitted into a pipe for fitting a valve insert therein.
Figure 5B:
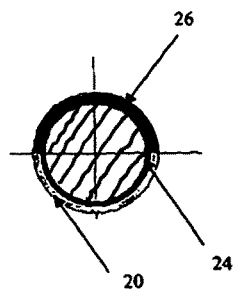
FIG. 5b shows a section through the pipe of FIG. 4a with the sleeve of FIG. 5a inserted.
Figure 5C:
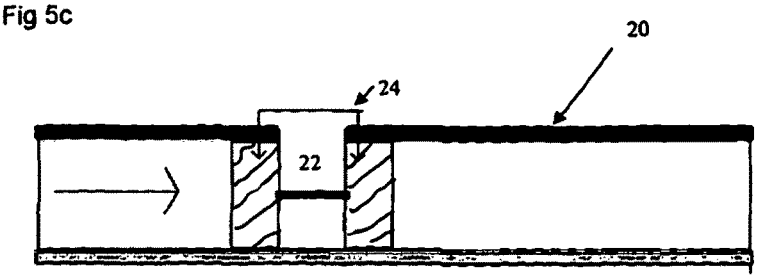
FIG. 5C is a side cross-sectional view of a pipe with two sleeves as shown in FIG. 5a inserted.

As shown in FIGS. 5a to 5C, it is possible to fit the insert 10 into the pipe 20 by fixing it in position between two sleeves 24. As will be understood from those figures, each sleeve 24 is substantially annular, with a semi-annular lip or flange 26 at one end thereof. A sleeve 24 can be inserted into the pipe 20 via the slot 22 and push fitted to one side of the slot 22 so that the majority of the sleeve 24 sits against the inner surface of the pipe 20 and the semi annular flange 26 sits against the semi annular edge which has been formed on the pipe 20 by the cut made therein. Hence the semi annular flange 26 enables the sleeves 24 to be fitted securely in place within the pipe 20. In the arrangement shown in FIG. 5C, sleeves 24 are fitted at either side of the slot 22 in the pipe 20. In FIGS. 9a to 9f one of the sleeves (shown on the left hand side in those figures) has a cut-out upper portion to accommodate an edge of the valve flap 18 when it is in an open position as shown in FIG. 9c. The cut out portion on the sleeve 24 enables the surface of the valve flap to lie flush against the inner surface of the pipe in which it is inserted, rather than lying against the inner surface of the sleeve 24, therefore reducing the inner bore of the pipe as little as possible. Other shapes of sleeves and cut outs are possible in accordance with the principles described herein.

Figure 6:
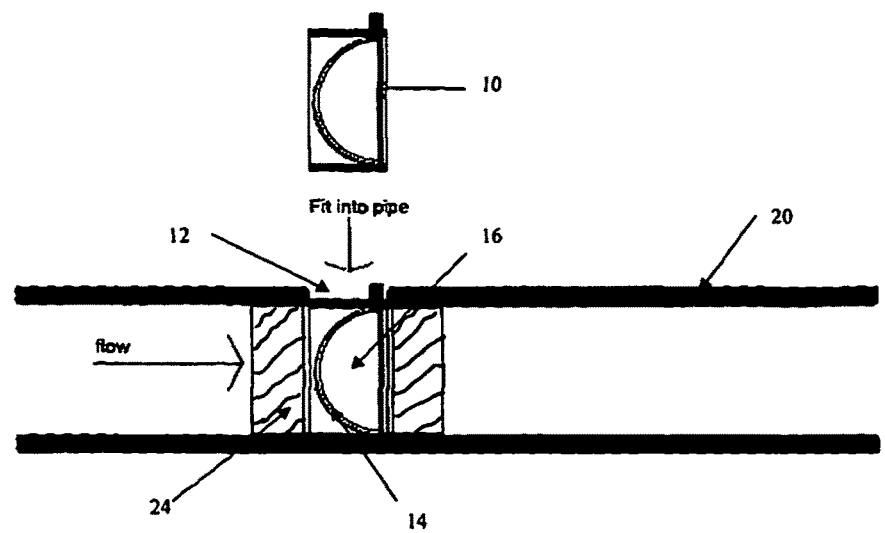
FIG. 6 shows a valve insert being fitted to the pipe of FIG. 5C.

As shown in FIG. 6, once the sleeves 24 have been fitted, an insert 10 as shown in FIG. 1b can be fitted into the pipe 20. The insert 10 should be sized so as to plug the gap between the two sleeves 24, across the slot 22. As a result, there should be no gaps or leakage from the pipe 20 in the section which has been cut. It will be appreciated that this is not the only way to fit an insert 10 into a pipe 20. It is possible to omit the sleeves 24 described above, or to include a single sleeve 24, and/or to fix the insert 10 in position within the pipe 20 by any other suitable means. Importantly, the valve insert 10 described herein can be fitted within a pipe 20 without making a complete cut or severance across the diameter of the pipe 20 at any point. The insert 10 should fit snugly within the pipe 20, so that there are no gaps between an outer surface of the insert 10 and an inner surface of the pipe 20. Any suitable sealing means can be provided so that there is no leakage into or out of the pipe via the slot 22 once the insert 10 has been fitted therein.

Figure 8A:
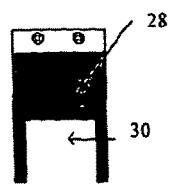
FIG. 8a is a side view of jointing strap for fitting to a pipe.
Figure 8B:
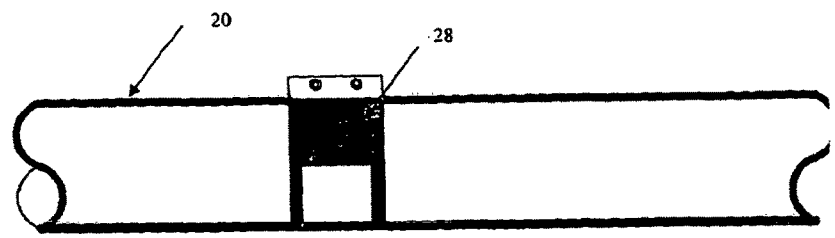
FIG. 8b shows a pipe with the jointing strap of FIG. 8a securely fixed thereto.

FIGS. 8a and 8b show a jointing strap 28 (also shown in FIGS. 2a and 2b) that can be used as a slot cutting template for a pipe. As can be seen therefrom, the jointing strap 28 can be wrapped around and affixed to the outer surface of a pipe 20 in any suitable manner. The strap 28 comprises a cut out portion 30 which can serve as a slot cutting template for cutting the correct size of slot 22 in order to fit a particular insert 10 into the pipe 20. The cut portion 30 can also hold the insert 10 in place when the pipe 20 is being sealed therearound.

After the pipe 20 has been cut and the insert 10 and any affixing means such as seals or sleeves 24 have been positioned within the pipe 20, the jointing strap 28 can be rotated so that the cut out portion 30 thereof surrounds a portion of the pipe 20 which has not been cut (i.e. the lower half of the pipe 20 in the figures herein) and the slot 22 of the pipe 20 is covered by a continuous section of the strap 28. This can enhance the seal formed between the insert 10 and the pipe 20. Furthermore, the jointing strap 28 acts as an indicator for the user as to the location of the insert 10 inside the pipe 20. If the non-return valve needs to be altered, removed or replaced, the user can simply and easily rotate the strap 28 and thereby provide access to the insert 10 within the slot 22. This is achieved in a simple and efficient manner. Furthermore this arrangement enables someone other than the person who fitted the strap 28 and cut out the slot 22 to access the insert 10 subsequently in order to alter, replace or remove the non-return valve. The valve insert 10 can therefore be provided as a do-it-yourself (DIY) kit for a domestic user to install a non-return valve in a pipe. It does not have to be fitted, replaced or repaired by a plumber or other professional tradesperson.

Deformable Valve Flap

Figure 3:
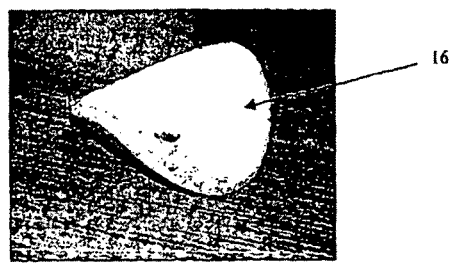
FIG. 3 is a perspective view of a valve flap according to an embodiment.

The valve insert 10 described with respect to FIGS. 1a to 9f comprises a substantially rigid valve flap 16 which has a fixed saddle-like shape as shown best in FIG. 3. However it is also possible for an insert to be provided for implementing a valve within a pipe or conduit wherein the insert has a different type of valve flap which is at least partially deformable.

Figure 10:
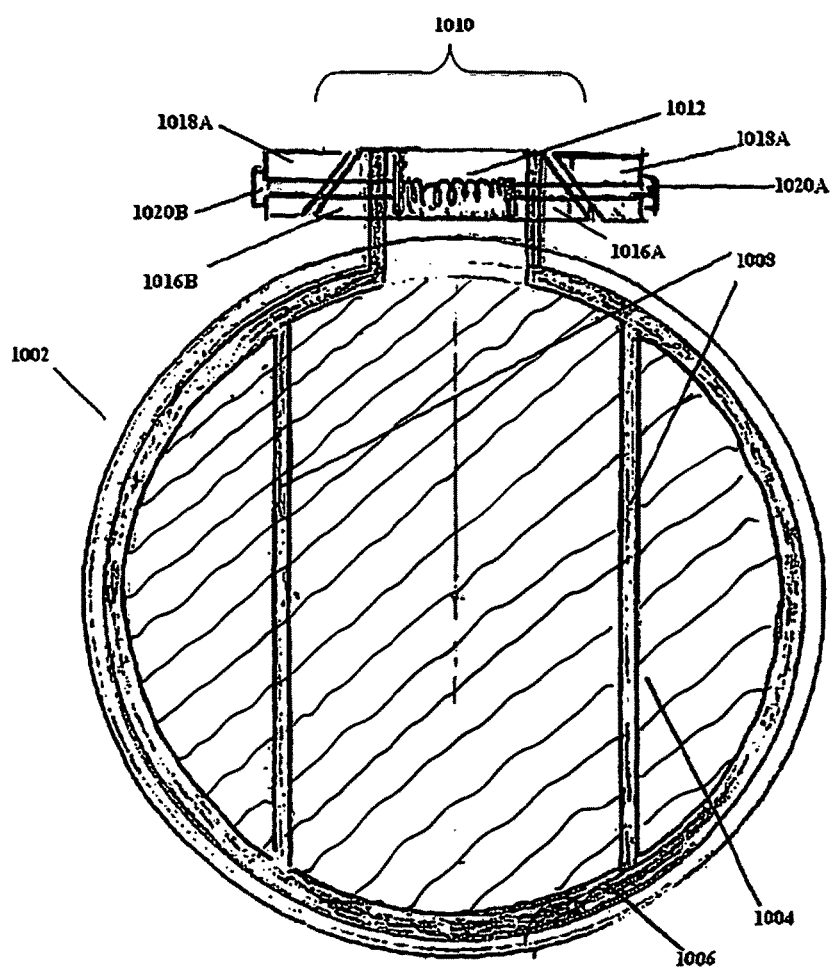
FIG. 10 shows a plan view of a deformable valve flap and spring attachment for a valve insert.

FIG. 10 shows a deformable valve flap 1002 for inserting into a pipe in order to provide a valve within that pipe. The deformable valve flap 1002 shown in FIG. 10 is substantially circular in cross-section in order to be compatible with a substantially cylindrical pipe. However it is possible for the deformable valve flap 1002 to have a different cross-sectional shape in order to be compatible with a different shape of pipe or conduit. The deformable valve flap 1002 includes a substantially planar flap body 1004. The substantially planar flap body 1004 is formed from a flexible material such as rubber. As described in more detail below, the flexibility of the flap body 1004 enables it to be deformed away from its substantially planar configuration upon application of a force thereto. For example, the flap body 1004 may be deformed by the pressure of water or other fluid pushing against the valve flap 1002 within a pipe.

The deformable valve flap 1002 further comprises a flexible wire 1006 in order to provide some rigidity. The flexible wire 1006 may comprise spring wire or any other suitable type of wire. The flexible wire 1006 is preferably provided in a substantially circular configuration (except at the top as described further below) proximal to but not quite at the outer edge of the flap body 1004. Such a configuration reinforces the outer edge of the flap body 1004 but at the same time enables the radially inner parts of the flap body 1004 to still be deformable.

In the embodiment shown in FIG. 10 the flexible wire 1006 is also provided in two substantially parallel strips 1008 either side of the axial centre of the flap body 1004. The strips 1008 of wire each join an upper part of the circular part of the flexible wire 1006 to a lower part thereof. It will be appreciated that the particular configuration of flexible wire 1006 shown in FIG. 10 is only one example. The flexible wire 1006 can be provided in any suitable configuration that balances the deformability and rigidity requirements for the valve flap 1002 in operation, which is described further below.

The flexible wire 1006 should be reliably attached to the substantially planar flap body 1004. The flexible wire 1006 may be bonded to the flap body 1004 or attached thereto by any other suitable means for example by welding, moulding or over moulding. As the skilled reader will appreciate, the best means for attaching the flexible wire 1006 to the flap body 1004 will depend at least in part on the particular materials chosen for the component parts of the deformable valve flap 1002.

Figure 13:
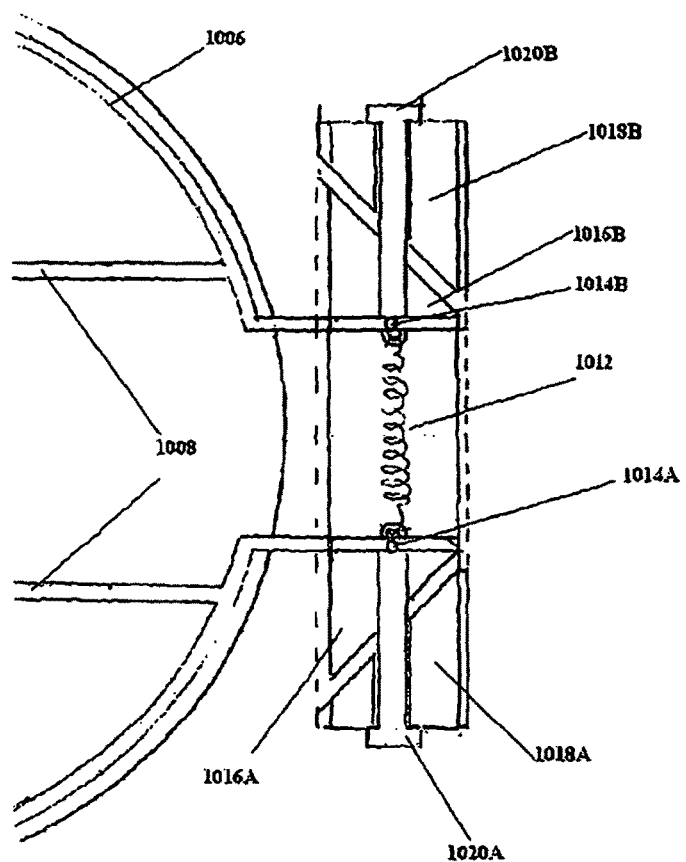
FIG. 13 shows a magnified view of the top of the deformable valve flap and spring attachment of FIG. 10.

In the embodiment shown in FIGS. 10 and 13 either end of the flexible wire 1006, at the top of the substantially circular part, extends from the flap body 1004 to attach to a plate 1010 and spring 1012 mechanism. The ends of the flexible wire 1006 connect to either side of a coiled spring 1012 at first and second respective connection points 1014A, 1014B. First and second respective inner plate portions 1016A, 1016B are provided outward of the first and second connection points 1014A, 1014B. The plate 1010 further includes outer plate portions 1018A, 1018B located outward of the respective inner plate portions 1016A, 1016B. On either side of the spring 1012 there is a pin 1020A, 1020B which runs from the respective connection point 1014A, 1014B, through the inner plate portion 1016A, 1016B and through the outer plate portion 1018A, 1018B. The pins 1020A, 1020B terminate outward of the outer plate portions 1018A, 1018B and have pin heads which ensure that they are fixed to the outer plate portions 1018A, 1018B.

An axis of rotation is defined for the valve flap 1002, which runs substantially through the axial centre of the plate 1010 and spring 1012 mechanism. In operation, pressure of fluid in a pipe will cause the valve flap 1002 to rotate about the axis to create an opening in the pipe and thereby allow throughflow. The inner plate portions 1016A, 1016B rotate with the valve flap 1002 however the outer plate portions 1018A, 1018B do not rotate. Instead, rotation of the inner plate portions 1016A, 1016B cause the corresponding outer plate portions 1018A, 1018B and pins 1020A, 1020B to move outwards, away from the centre of the spring 1012. Because the pins 1020A, 1020B are attached to either end of the spring 1012, this outward movement has the effect of stretching the spring when the valve flap 1002 rotates. Therefore the spring 1012 is under tension when the valve flap 1002 is rotated to an open position. When the fluid pressure is removed from the valve flap 1002, the bias of the spring 1012 (to return to its relaxed position) encourages the outer plate portions 1018A, 1018B to move inwards and hence encourages the inner plate portions 1016A, 1016B, and the ends of flexible wire 1006 to which they are connected, to rotate again in the opposite direction and thereby rotate the valve flap 1002 back to its closed position.

Figure 11:
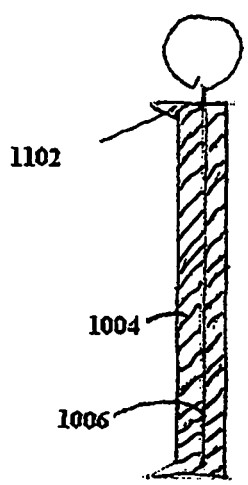
FIG. 11 shows a side view of a deformable valve flap and spring attachment.

FIG. 11 shows an embodiment of the deformable valve flap 1002 attached to a coiled spring 1012. As can be seen therein, the coiled spring 1012, which is stretched by rotation of the flap body 1004 as described above, can be a continuation of the flexible wire 1006 that is used to provide rigidity to the flap body 1004.

In FIG. 11 the spring wire 1006 is embedded within the flap body 1004 rather than being fixed to a surface of the flap body 1004 as shown in FIG. 10. As can also be seen from FIG. 11, it is possible for the outer edge of the flap body 1004 to be flared to provide a rim 1102 around the outer edge of the flap body 1004. Such a rim 1102 can help to locate the deformable valve flap 1002 next to a sleeve or seal (not shown in FIG. 11) in order to enhance the closure of the pipe when the deformable valve flap 1002 is in its closed position.

The deformable valve flap 1002 can be provided as part of an insert including an insert body, as described in detail above with respect to the substantially rigid valve flap. The insert body can be substantially annular or cylindrical, to make it compatible with a cylindrical pipe, or it can be of any other suitable shape dependent on the shape of the pipe or conduit in which the insert is to be inserted. As described in detail above, the insert can be placed into a pipe by cutting a slot into the pipe, but not cutting through the pipe entirely, and fitting the insert into the slot where the section of pipe has been removed. The insert can include a seal as described in more detail with respect to FIGS. 11 and 12 herein. In addition it can be used in conjunction with one or more sleeves.

Figure 12:
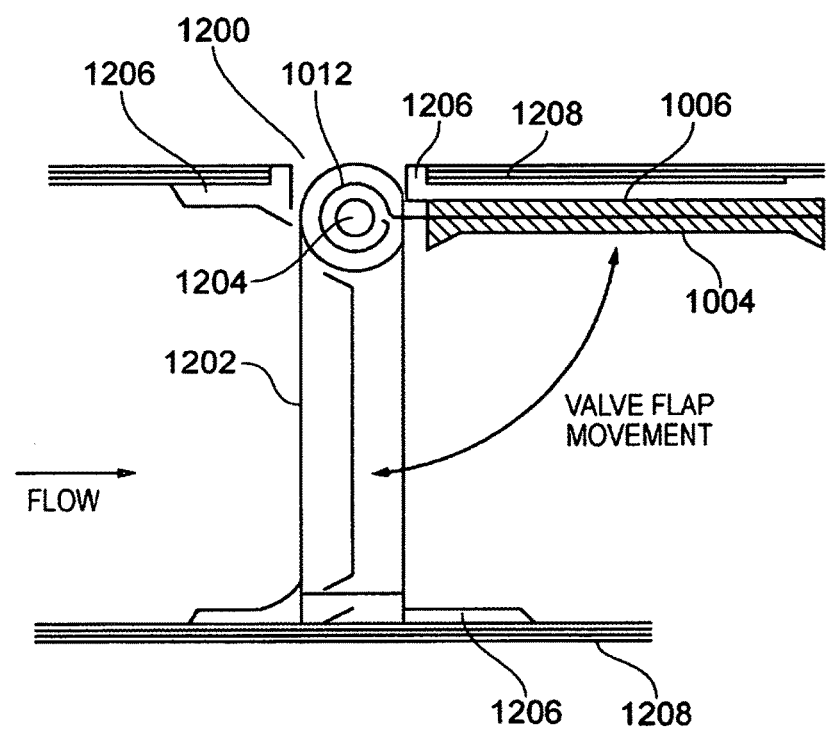
FIG. 12 shows a side view of an insert including a deformable valve flap in situ in a pipe.

FIG. 12 shows an embodiment of an insert 1200 which includes a deformable valve flap 1002. The insert 1200 includes an insert body 1202, a deformable valve flap 1002 including a deformable flap body 1004 and flexible wire 1006, and a spring 1012 provided above the flap body 1004. The spring 1012 shown in FIG. 12 is a continuation of the flexible wire 1006 which is attached to the flap body 1004. The spring 1012 is coiled around an axis 1204, about which the deformable valve flap 1002 can rotate in order to move from a closed position to an open position. Any suitable spring or other biasing mechanism can be provided so as to allow rotation of the valve flap 1002 in one direction (i.e. anti clockwise from closed to open in FIG. 12). Rotation of the valve flap 1002 in the opposite direction (i.e. clockwise from closed to open in FIG. 12) can be prevented either by the spring and/or by the insert body 1202 including a blocking means to prevent such rotation. Although not shown in FIG. 12, the insert body 1202 can also include a seal or seat against which the flap body 1004 can fit when in the closed position.

Also shown in FIG. 12 are two sleeves 1206 provided either side of the insert body 1202 within a pipe 1208. As described above in relation to the rigid flap embodiment, the sleeves 1206 can assist with locating the insert 1200 within the pipe 1208 once a slot has been cut therein. The sleeves 1206 can also help to ensure that the pipe 1208 is airtight and watertight to prevent leaks once the insert 1200 has been inserted into the pipe 1208.

Although not shown in the figures, it is possible for the base of an insert (which includes either a rigid or a deformable valve flap) to include a spigot extending therefrom wherein the spigot can locate into a recess on the bottom surface of the pipe in order to further secure the insert therein. For example, after a user has created a slot in the pipe he or she could then create an indentation or recess in the lower inner surface of the pipe before the insert is fitted therein, so as to locate the spigot into that indentation or recess thereafter.

Once it has been inserted into a pipe or conduit, the deformable valve flap 1002 can function so as to provide a non-return valve within that pipe or conduit. As with the rigid valve flap 16 described above, the deformable flap 1002 can be rotatable in one direction only, so as to allow flow along the pipe or conduit in one direction but not in the other. One particular example of spring mechanism that can be used in conjunction with the deformable valve flap 1002 has been described herein with respect to FIGS. 10 and 13. However it will be appreciated that any other suitable biasing means can be used in conjunction with the deformable valve flap 1002, for example the biasing mechanism shown herein in relation to the rigid valve flap insert. In operation, pressure of water or other fluid in the allowed direction through the pipe pushing against the valve flap 1002 will cause the valve flap 1002 to rotate within the pipe body and thereby to create an opening to allow fluid throughflow.

The fluid pressure will cause the deformable valve flap 1002 to rotate but may initially not substantially deform its shape. However once more pressure is exerted and the valve flap 1002 moves towards a fully open position, the pressure of the fluid will have the additional effect of deforming the shape of the flap body 1004, forcing it to deform and take the internal shape of the pipe in which it is fitted. As the skilled reader will appreciate, the configuration of flexible wire 1006 shown in FIG. 10 is particularly useful because the central portion of the flap body 1004, between the strips 1008 of flexible wire, has limited rigidity and thus will be quite deformable when subjected to fluid pressure. This will enable that central portion of the flap body 1004 to arch upwards against an inner surface of the pipe when the deformable valve flap 1002 is in an open position.

As is the case for the rigid valve flap 16 described above, when there is no fluid pressure in the allowed direction on the deformable valve flap 1002, or when there is pressure from fluid in the non-allowed direction on the valve flap 1002, the valve flap 1002 will revert to a closed position wherein the flap body 1004 fills the body of the pipe and therefore prevents fluid throughflow in the non-allowed direction. If the flexible wire 1006 is provided proximate the outer edge of the flap body 1004 as shown in FIG. 10, this will reinforce the valve flap 1002 and will help to lock it into the closed position. It will also reinforce the flap's resistance against fluid pressure in the non-allowed flow direction.

As mentioned above, an insert including a deformable valve flap 1002 as described herein can include a suitable spring or other biasing means. That biasing means may be housed within the main body of the insert, so as to sit within the cut-out section of pipe when the insert is placed therein, or the biasing mechanism may sit outside the main body of the insert and therefore lie outward of the cut-out section of pipe when the insert is in place. The spring 1012 and plate 1010 arrangement described in relation to FIGS. 10 and 13 above preferably is provided external to the annular insert body. As described above in relation to the rigid valve flap insert, it is possible to use a jointing strap around the cut-out section of pipe when the insert is placed therein. If, as would be the case for the arrangement shown in FIGS. 10 and 13 herein, the biasing mechanism protrudes from the surface of the insert body, the jointing strap can include a suitable recess in order to house that biasing mechanism. Any such recess in the jointing strap should allow component parts of the biasing mechanism, such as the pins 1020A, 1020B and outer plate portions 1018A, 1018B, to move as required for correct operation of the insert in practice.

An insert that includes a deformable valve flap 1002 as described above has similar advantages to an insert that includes the rigid valve flap 16 in that the valve flap can arch over fluid flow in the allowed direction in the pipe, therefore maximising the cross-sectional area for that fluid flow. The deformable valve flap 1002 can be very thin, due to being formed of rubber or other deformable material, and so it will reduce the bore of the pipe very little when in an open position. Furthermore, because the flap body 1004 is so thin, it is suitable for being fitted into very tight spaces where conventional valves simply could not be fitted. A deformable valve flap that is substantially planar in its relaxed configuration can be manufactured in a relatively straightforward manner, and a plurality of such deformable valve flaps can be stacked compactly for efficient storage and shipping.

Variations

The specific arrangements described above with respect to the figures involve pipes, insert bodies and valve flaps of circular cross-section however the same principles apply to other cross-sections such as oval, elliptical and irregular shapes. If a pipe has a slightly irregular cross-section, an irregular insert or irregular valve flap can be designed so that its outer surface matches the cross-section of the pipe so as to mate therewith. When the insert comprises a valve flap provided in conjunction with an irregular insert body, an inner surface defined between the open ends of the insert body can be of a more regular cross-sectional shape, such as circular, so that a valve flap which is shaped to close a circular opening can be used therewith. Additionally or alternatively, the thickness of the insert between its inner and outer surfaces can vary across its extent, to account for differences in pipe thickness and/or the absence of pipe wall at any point when the insert is fitted thereto. In all cases, the non-return valve insert should reduce the bore of the pipe as little as possible whilst at the same time providing a reliable blockade against flow when the valve flap is in the closed position.

If the valve insert needs to be altered, changed or replaced, this can be done quickly and easily by removing the insert from the pipe without having to make any physical changes to the pipe itself. It is possible for the entire valve insert, including the insert body, valve flap and any attachment mechanisms, to be replaceable as a single unit. Alternatively or additionally, a valve flap could be replaced without replacing the body of the insert. Furthermore, the seal formed on the inner surface of the insert body could be replaced or updated as appropriate in order to ensure reliable operation of the valve over time.

In the arrangements described above, the insert is arranged to provide a non-return valve however the shape of the valve flap is also useful for other types of valve. Because the substantially rigid valve flap is U-shaped in side cross section, it maximises flow in one direction along a conduit when in an open position. If the substantially rigid valve flap was allowed to rotate about its hinge in response to flow in a second, opposite direction along the conduit, its curvature would not arch over the axis of flow but would abut against it. Therefore the flow in that second direction would be at least partially impeded by the valve flap. The substantially rigid valve flap can thus be used in arrangements where flow is to be permitted in both directions in a conduit, but is to be more limited in one direction than in the other.

It is possible to fit other components within a pipe or conduit that could work with the valve inserts described herein. For example, stopcock valves can be added either side of the insert within a pipe, for relieving water pressure when the insert is being changed in a water pipe. Alternatively or additionally, it is possible to include an iris or other type of shut off valve upstream of the insert for shutting down flow in the pipe or conduit before the insert is replaced or changed. For example, such an iris could comprise a manually operated, knurled arrangement which forms a blockade in the pipe or conduit, preventing flow downstream to the non-return valve. Alternatively or additionally, the iris could be operated by a gear or other mechanism on the outside of the pipe in preparation for work on the non-return valve.

The process of changing or replacing the insert is quick and easy. Once any external components such as the strap on the outside of the pipe have been removed, the insert comprising the valve flap can slot out of the pipe and a replacement can immediately be inserted therein. Thus it is possible to avoid, or at least to substantially cut down on, time and money being lost in shutting down a production line for changing of a non-return valve. The ease and speed with which the valve insert can be fitted and changed is also highly advantageous for DIY applications since the user would not have to enlist the services of a plumber for changing the valve and would not have to buy a completely new valve in a conventional sense, but could simply replace the valve insert.

The valve insert could be fed from an open end of a pipe or conduit, to the desired position, instead of being inserted via a slot in the pipe. However it will be appreciated that in some instances, particularly where a valve must be implemented in an existing system such as a plumbing system, inserting the insert via a slot in the conduit will be the preferred option, to minimise disruption to the system.

The valve insert as described herein provides an entirely scalable, flexible solution. It is different to conventional products since it does not have to provided in the form of a ready-made non-return valve per se, but can be a kit which allows (part of) a pipe or conduit to operate as a non-return valve.

Although an annular insert with an attached valve flap has been described herein, any appropriate insert shape may be used. The size of the insert body and valve flap can be designed and selected based on the size of the pipe or conduit in which they are to be fitted. The design should ensure that the valve flap can create a blockade against flow when in a closed position and allow flow in the other, arching over the flow direction to reduce the pipe bore as little as possible when in an open direction. As most industrial manufacturers of pipes produce pipes of standardised diameters, standard non-return valve inserts can be made to cooperate with those pipes. Furthermore, if a pipe is of a non-standard size or shape it is possible to custom design and make a non-standard insert with a valve flap that can mate with that pipe and/or to seal a standard insert into an irregular pipe. If the latter is being done, the size and shape of the insert should be chosen so as to reduce the bore of the pipe as little as possible and to enable as much throughflow of fluid or other material in the pipe when the valve flap is in the open position during use.

Because the valve insert can be quickly and easily accessed, it is possible to check the operation of the non-return valve on a regular basis without substantially interfering with the operation of the pipeline system. This is advantageous, for example, when the insert is used to provide a non-return valve in the water or sewage system within a home or other building, since the valve can be regularly checked for insurance purposes and to avoid problems such as flooding and overflow before they happen.

It is possible to fit an additional feature such as a viewing eye for checking whether the valve is working without removing it. The viewing eye could also be used during maintenance of the valve insert.

Whilst the valve inserts have been described herein predominantly with respect to controlling water or other fluid in a pipe, there are many other applications of the valve insert. For example it could be used within a vehicle engine, or in any other system including one or more conduits in which control of flow in one direction is desired.

As well as acting to control flow as described in detail hereabove, the non-return valve insert can have additional uses in a pipeline. For example, the insert could be impregnated with a suitable substance to be dissolved into the flow of fluid or other material that the non-return valve is designed to control. Thus the insert could act as a water softening cartridge, a slow release inhibitor for a central heating system or a catalytic converter for an exhaust pipe. Additionally or alternatively, part of or the entire insert can be formed from a material that will dissolve in, or react with, a fluid in the conduit. For example part of or the entire insert may be formed from copper or platinum. Additionally or alternatively, the non-return valve insert could be used in water testing and purveying for mains drinking water. In addition, the insert might be used as a test device for extracting substrate from fluid. For such a purpose, the insert body could include storage means and/or could include means for directing the extracted substrate away from the pipe.

The insert can be made from any suitable material including metal, ceramic, plastic, rubber, wire or other manmade material. Whilst the valves described above can include a hinge and spring mechanism for attaching the valve flap to a body of the insert, any suitable attachment means may be used as long as it enables the valve flap to go from a closed position to an open position when in use. Instead of a hinge for rotation of the valve flap, means can be provided for translational or other movement of the valve flap from a closed position to an open position in use. According to an embodiment, the valve flap and seal can be used in a pipe for blocking flow without an insert body also being provided. In such an embodiment, the valve flap can attach directly to the pipe and/or to the seal.

The substantially deformable valve flap can be made from any suitable material or combination of materials. Although flexible wire has been used in the specific embodiment described herein to add rigidity and guide deformation of the deformable valve flap, any suitable other material(s) could instead be used for this purpose.

The valve flap can be spring loaded so as to bias it in the closed direction by a mechanical spring as shown in the figures herein. Alternatively, this biasing means could be achieved using fluid or any other suitable alternatives to springs. When the non-return valve insert is used within an engine, for example a car engine, the valve flap could move towards the open position due to the force of an explosion within the engine.

It is possible to use one or a plurality of valve inserts in a pipe or other conduit for controlling flow therein. The inserts can be fitted and operated in conjunction with existing valve arrangements or as a replacement for such arrangements.

Any reference to relative terms such as "clockwise", "anti-clockwise", "right", "left", "upper" or "lower" made herein is made only to describe the particular arrangement shown in the figures. It is not intended to be limiting.

The embodiments and examples as described herein provide a flexible, scalable solution by which a non-return valve can be implemented in a cost effective manner. The non-return valve insert can be fitted, replaced and amended simply and quickly, making it user friendly and applicable to a wide range of industries and practical situations.

The invention claimed is:

1. A method of installing an insert for provision of a valve in a conduit, the method comprising creating a slot in the surface of the conduit, said slot not extending across a full cross-section of the conduit, and fitting the insert, which includes an insert body and a valve flap, via said slot; wherein creating the slot in the surface of the conduit comprises affixing a jointing strap having a cut out portion to an outer surface of the conduit and using the cut out portion as a slot cutting template for the conduit; and the cut out portion of the jointing strap holding the insert in place when the conduit is being sealed therearound.

2. The method of claim 1, wherein the slot extends across no more than half a cross-section of the conduit.

3. The method of claim 2, wherein the slot is cut in a direction substantially perpendicular to the direction of fluid flow in the conduit.

4. The method of claim 1, wherein the slot is sized to enable fitting of the insert into the conduit, and to ensure that the conduit and the insert form a leak-proof continuum after this fitting has taken place.

5. The method of claim 1, wherein the conduit has a substantially circular cross-section and the insert is substantially annular, the method further comprising removing a semi-annular section of the conduit to fit the annular insert into the conduit.

6. The method of claim 5, further comprising fitting a sleeve into the conduit at a side of the slot.

7. The method of claim 6, wherein the sleeve is substantially annular, with a semi-annular flange at one end thereof, wherein after the sleeve is fitted into the conduit, the method further comprises push fitting the sleeve to the side of the slot so that the majority of the sleeve sits against the inner surface of the conduit, the semi-annular flange of the sleeve siting against a semi-annular edge formed in the conduit by the slot created therein.

8. The method of claim 7, wherein two sleeves are fitted into the conduit, said sleeves being fitted at either side of the slot, and further comprising fitting the insert into the conduit by fixing it in position between the two sleeves.

9. The method of claim 1, wherein, after the conduit has been cut and the insert positioned within the conduit, the jointing strap is rotated so that the cut out portion thereof surrounds a portion of the conduit which has not been cut and the slot of the conduit is covered by a continuous section of the jointing strap.

10. The method of claim 1, comprising fitting stopcock valves either side of the insert within the conduit for relieving water pressure when the insert is being changed in a water pipe.

11. The method of claim 1, further comprising fitting a shut-off valve upstream of the insert for shutting down flow in the conduit before the insert is replaced or changed.

12. The method of claim 11, wherein the shut-off valve is an iris, wherein: a) the iris comprises a manually operated, knurled arrangement which forms a blockade in the conduit, preventing flow downstream to the valve flap; and/or b) the iris is operated by a mechanism on the outside of the conduit in preparation for work on the valve flap.

13. The method of claim 1, further comprising fitting a plurality of said valve inserts in the conduit for controlling flow therein.

14. The method of claim 1, wherein the insert is a non-return valve insert.

15. An insert for provision of a valve in a conduit, the insert comprising an insert body and a valve flap, wherein the insert is to be fitted in the conduit via a slot formed in the surface of the conduit, said slot not extending across a full cross-section of the conduit; and a jointing strap for affixing to an outer surface of the conduit, the jointing strap having a cut out portion; wherein the cut out portion of the jointing strap forms a slot cutting template for creating the slot in the conduit, and the cut out portion holds the insert in place when the conduit is being sealed therearound.

16. The insert of claim 15, comprising a sleeve to be inserted into the conduit at a side of the slot.

17. The insert of claim 16, wherein the sleeve is substantially annular so that the majority of the sleeve sits against an inner surface of the conduit, the sleeve having a semi-annular flange at one end thereof for siting against a semi-annular edge formed in the conduit by the slot created therein.

18. The insert of claim 17, comprising two of said sleeves to be fitted in the conduit at either side of the slot, the insert being fixed in position in the conduit between the two sleeves.

19. The insert of claim 18, wherein the insert is sized so as to plug the gap between the two sleeves, across the slot.

20. The insert of claim 15, further comprising a jointing strap to be affixed to an outer surface of the conduit, the jointing strap having a cut out portion which can serve as a slot cutting template for cutting the correct size of slot in order to fit the insert into the conduit.

21. The insert of claim 15, wherein the jointing strap is configured to be rotated so that the cut out portion thereof surrounds a portion of the conduit which has not been cut and the slot of the conduit is covered by a continuous section of the jointing strap.

22. The insert of claim 15, wherein the insert is a non-return valve insert.

23. A method of creating a slot in the surface of a conduit, the method comprising affixing a jointing strap having a cut out portion to an outer surface of the conduit and using the cut out portion as a slot cutting template for the conduit; wherein, after the conduit has been cut and an insert positioned within the conduit, the jointing strap is rotated so that the cut out portion thereof surrounds a portion of the conduit which has not been cut and the slot of the conduit is covered by a continuous section of the jointing strap; the cut out portion of the jointing strap holding the insert in place when the conduit is being sealed therearound.

* * * * *